United States Patent
Kothari et al.

(10) Patent No.: US 8,745,411 B2
(45) Date of Patent: Jun. 3, 2014

(54) PROTECTING EXTERNAL VOLATILE MEMORIES USING LOW LATENCY ENCRYPTION/DECRYPTION

(75) Inventors: Love Kothari, Sunnyvale, CA (US); Lawrence J. Madar, III, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 650 days.

(21) Appl. No.: 12/614,383

(22) Filed: Nov. 6, 2009

(65) Prior Publication Data

US 2010/0146303 A1   Jun. 10, 2010

Related U.S. Application Data (60) Provisional application No. 61/112,708, filed on Nov. 7, 2008.

(51) Int. Cl.
*G06F 21/00* (2013.01)
(52) U.S. Cl.
USPC ............ 713/193; 713/189; 327/545; 327/546
(58) Field of Classification Search
USPC ........................... 327/545–546; 711/163–164
See application file for complete search history.

(56) References Cited

U.S. PATENT DOCUMENTS

| | | | |
|---|---|---|---|
| 2001/0018736 A1* | 8/2001 | Hashimoto et al. | 713/1 |
| 2003/0065933 A1* | 4/2003 | Hashimoto et al. | 713/194 |
| 2006/0026442 A1* | 2/2006 | Ittogi | 713/189 |
| 2008/0253561 A1* | 10/2008 | Minematsu | 380/29 |
| 2009/0060198 A1* | 3/2009 | Little | 380/278 |

OTHER PUBLICATIONS

Data Encryption Standard, Federal Information Processing Standards Publication 46-3, Category: Computer Security, Subcategory: Cryptography, (Oct. 1999), 26 pages.

* cited by examiner

*Primary Examiner* — Ghazal Shehni
(74) *Attorney, Agent, or Firm* — McDermott Will & Emery LLP (57) ABSTRACT

A data processing apparatus includes a volatile memory, a random number generator adapted for generating random numbers from which one or more keys are generated, and a memory encryption unit (MEU). The MEU is configured to receive an N-bit block of data and to divide the N-bit block of data into two more sub-blocks of data, where each sub-block contains fewer than N-bits. The MEU is further configured to encrypt each sub-block of data using the one more keys, to combine the encrypted sub-blocks into an N-bit block of encrypted data, and to write the encrypted N-bit block of data to the volatile memory.

22 Claims, 8 Drawing Sheets

PROTECTING EXTERNAL VOLATILE MEMORIES USING LOW LATENCY ENCRYPTION/DECRYPTION

CROSS REFERENCE TO RELATED APPLICATION

This application claims priority under 35 U.S. §119(e) to U.S. Provisional Patent Application 61/112,708, filed Nov. 7, 2008, titled "PRODUCTIVE PROTECTING EXTERNAL VOLATILE MEMORIES USING SINGLE PIPELINE STAGE ENCRYPTION/DECRYPTION," which is incorporated herein by reference in its entirety.

TECHNICAL FIELD

This description relates to computing systems, and, in particular to protecting external volatile memories using single pipeline state encryption and decryption.

BACKGROUND

Integrated circuits may be subject to different types of security attacks. For example, application processor chips used to play content files (e.g., video files, music files, etc.) may be hacked by users seeking access to protected or proprietary content. For example, a hacker may wish to gain access to protected content (e.g., content that is protected by digital rights management (DRM), such as copyrighted audio or video files that are intended to be sold to a user). After gaining access to the protected content, a successful hacker may also be able to copy and/or distribute this video/audio content to others in contravention to security controls placed on the content file. Such security controls may be used by an owner of the content file (e.g., a record label, movie studio, content distribution company, etc.) to prevent access to or unauthorized copying and distribution of the file.

One of the ways to protect a content file from unauthorized access, copying, and distribution is to encrypt the file using an encryption standard such as data encryption standard (DES) encryption, triple DES (3DES) encryption or advanced encryption standard (AES). By using a DES, 3DES or AES encryption key known only to an authorized entity and the processor chip, it can be assured that only an authorized entity can decode the content properly. Encryption using DES, 3DES or AES may also protect the content from a hacker trying to peek at the data using a logic analyzer at the chip-memory interface or removing the memory from board and examining it separately. However, DES, 3DES or AES decryption algorithms suffer from latencies induced in a pipeline to the processor, which substantially reduce throughput of content on the processor chip. For example, typical encryption algorithms tend to take 10's of clock cycles to complete one encryption operation, and typical DES, 3DES or AES decryption algorithms can require many processor cycles (e.g., 16 or more cycles) to encrypt or decrypt a block of data. Thus, when writing protected data to a volatile memory (e.g., a random access memory), because a memory encryption unit that performs the encryption needs to encrypt each memory access, an encryption algorithm that requires more than 1 or 2 clock cycles can impose a burdensome penalty on the processing of the data.

In addition to latency problems associated with performing an encryption algorithm, block size is another important aspect of any encryption system. Block size is the minimum fixed length string of bits on which an encryption algorithm works. DES, for example, has a block size of 64-bits. Most microprocessors support memory accesses on 8-bit boundaries, i.e. 8-bits, 16-bits, 32-bits, 64-bits and so on. If the block size of memory encryption is greater than 8-bits (e.g., 32-bit encryption or 64-bit encryption), then every write transaction that is smaller than the block size, must go through a read-decrypt-modify-encrypt-write cycle, which impedes throughput and increases power consumption of the system.

SUMMARY

The details of one or more implementations related to scalable solutions for protecting content files stored in external memories are set forth in the accompanying drawings and the description below. Other features will be apparent from the description and drawings, and from the claims.

DETAILED DESCRIPTION

A scalable solution is described herein for protecting data stored in an external memory (e.g., a memory external to a processing chip that communicates with the memory), such as volatile memories, using an encryption process that can be performed within one or only a small number of processor cycles. The encryption process can receive a large N-bit data block, where N is 16, 32, 64 or more, but splits the received block into multiple sub-blocks and then operates on a block size of 8-bits, thus eliminating the problem of requiring a read-decrypt-modify-encrypt-write cycle when writing data to the external memory.

An important feature of a cryptographic algorithm is the introduction of non-linearity into the encryption process. Non-linearity comes from the fact that a one bit change in the input data to the algorithm causes more than one output bit to change in the data output from the algorithm, and with every bit in output data being a function of every input bit and every key bit. Input data and output data of an encryption algorithm can be referred to, respectively, as plaintext and ciphertext.

Figure 1:
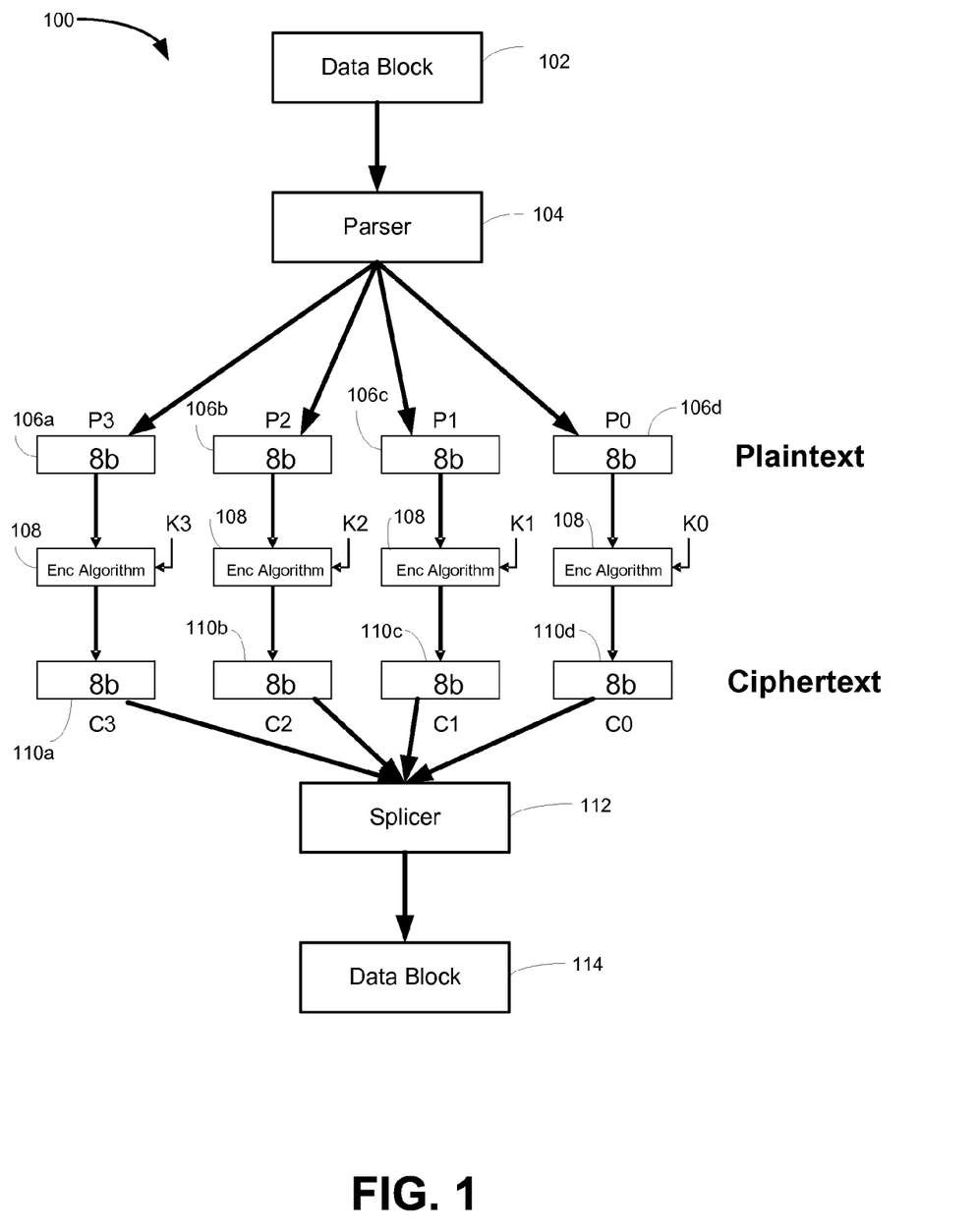
FIG. 1 is a block diagram of process for encrypting an N-bit block of data by dividing the block into a plurality of sub-blocks having fewer than N-bits and then encrypting each sub-block.

FIG. 1 is a block diagram of process 100 for encrypting an N-bit plaintext block of data 102 by dividing the block into a plurality of sub-blocks having fewer than N-bits and then encrypting each sub-block. For example, the plaintext block of data (e.g., a 32-bit block of data) 102 can be parsed by a parser 104 into four 8-bit sub-blocks of plaintext 106a, 106b, 106c, 106d. Although four sub-blocks are shown in FIG. 1, other numbers of sub-blocks can be used. The sub-blocks of plaintext 106a, 106b, 106c, 106d can be received by a processor or logic block that performs an encryption algorithm 108 that encrypts the input plaintext sub-blocks 106a, 106b, 106c, 106d according to the encryption algorithm and outputs 8-bit sub-block of ciphertext 110a, 110b, 110c, 110d.

The encryption algorithm can be a symmetric algorithm, where the same algorithm and key are used for both encryption and decryption. Thus, the inputs to the algorithm 108 are the plaintext sub-blocks 106a, 106b, 106c, 106d and keys K0, K1, K2, and K3, where a different key can be used to encrypt each plaintext sub-block 106a, 106b, 106c, 106d. The ciphertext sub-blocks 110a, 110b, 110c, 110d can be joined by splicer 112 into an N-bit block of ciphertext 114. Thus, in this manner the 8-bit encryption algorithm 108 can be extended to a 32-bit block of data, a 64-bit block of data, a 128-bit block of data, etc.

Figure 2:
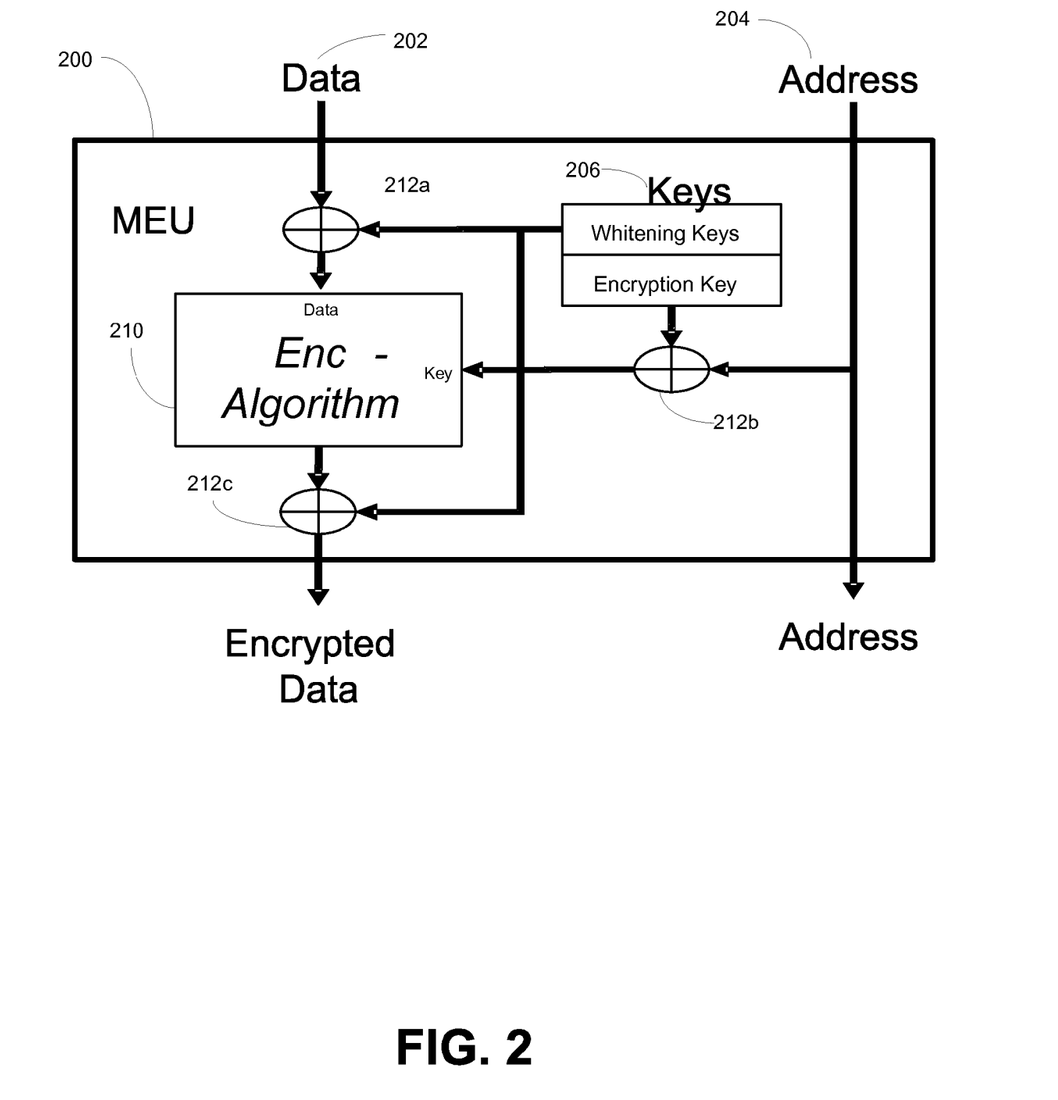
FIG. 2 is a block diagram of a memory encryption unit (MEU) that uses a data value, a memory address at which the data value is stored, and key to encrypt the data.

FIG. 2 is a block diagram of a memory encryption unit (MEU) 200 that uses a data value, a memory address at which the data value is stored, and key to encrypt the data. Encryption logic 210 of the MEU 200 can receive as input, not only the data values 202 that are to be encrypted, but also the physical or logical address 204 at which the data is stored in a memory device, as well as one or more keys 206. In one implementation, key whitening also can be used to increase the effectiveness of the encryption function performed by the encryption logic 210. For example, with key whitening, the data bits 202 and/or the address bits 204 can be mixed by a mixing logic 212a, 212b, or 212c with portions of an encryption key before and after the encryption algorithm is executed by the encryption logic. Mixing logic 212a, 212b, 212c can perform an exclusive OR ("XOR") combinatorial logic on the inputs to the logic. For example, mixing logic 212a can XOR the inputs of data bits and an encryption key and send the output to the encryption logic 210; mixing logic 212b can XOR the inputs of address bits and an encryption key and send the output to the encryption logic 210; and mixing logic 212a can XOR the output from the encryption logic 210 and an encryption key.

Figure 3:
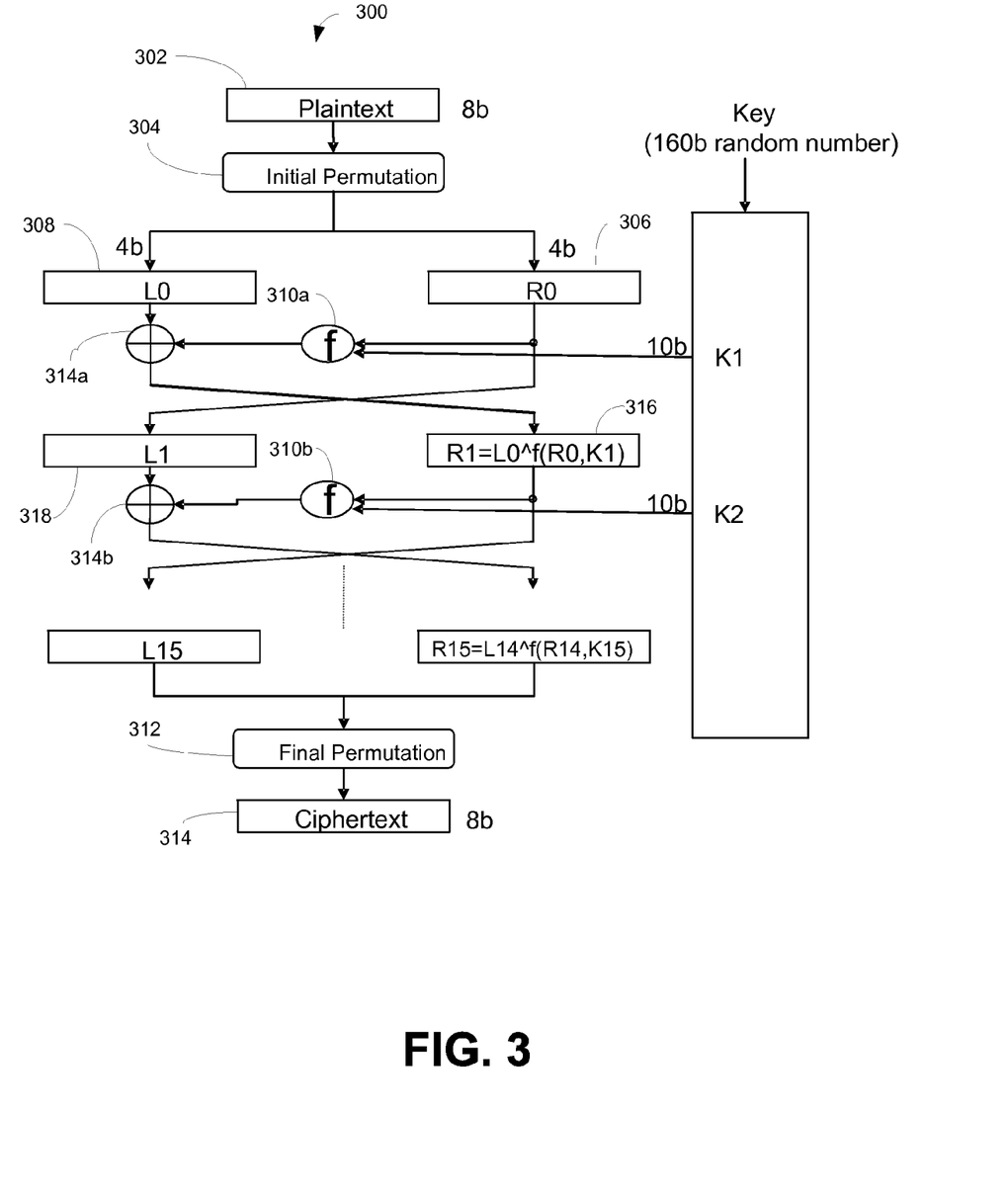
FIG. 3 is a block diagram of a process for encrypting an N-bit block of data by dividing the block into a plurality of sub-blocks having fewer than N-bits and then encrypting each sub-block using a non-linear encryption algorithm.

FIG. 3 is a block diagram of a process 300 for encrypting an N-bit block of data by dividing the block into a plurality of sub-blocks having fewer than N-bits and then encrypting each sub-block using multiple rounds of a non-linear encryption algorithm. In the process, an 8-bit block of plaintext 302 is input into an initial permutation 304, in which, for example, the eight bits can be swizzled, i.e., have the order of their bits changed. The block of plaintext 302 can be one of the sub-blocks 106a, 106b, 106c, 106d of data block 102. Swizzling is a computationally cheap operation because the order of the eight bits of the plaintext block 302 can be changed in the swizzling operation entirely through hard-wiring without having to do any processing.

An example Initial Permutation 304 ("Swizzle") that can be used on incoming plaintext data can take bits in the input in the following input positions and move them to the following output positions, as shown in the following TABLE 1

TABLE 1

| | Input | | | | | | | |
|---|---|---|---|---|---|---|---|---|
| | 0 | 1 | 2 | 3 | 4 | 5 | 6 | 7 |
| Output | 4 | 6 | 7 | 5 | 2 | 3 | 0 | 1 |

That is, a data bit in the $0^{th}$ position of the plaintext can be moved to the $4^{th}$ position, and the data bit in the $1^{st}$ position can be moved to the $6^{th}$ position, etc.

After the initial permutation 304, the resulting 8-bit block can be broken into a right half 306 and a left half 308, which are each four bits long. Then, the right half 306 and left half 308 can be mixed iteratively with each other and with encryption keys and also be processed through a function, "f," 310, which is explained below, and finally recombined and run though a final permutation (e.g., a swizzling operation) 312, to produce an 8-bit block of ciphertext 314. For example, after the initial permutation 304 and splitting the resulting plaintext into the left half 308 and the right half 306, in a first round, the encryption function "f" 310a can receive as input the right half and a key, K1. The output from the function "f" 310a can then be XOR'ed with the left half 308 in a XOR'ing operation 314a, and the output of the XOR operation 314a can become the right half input 316 for the second round. The left half input 318 for the second round can be the same as the right half input 306 for the first round. In the second round, the encryption function "f" 310b can receive as input the right half input 316 for the second round and a key, K2, which can be different from the key for the first round, K1. The output from the function "f" 310a can then be XOR'ed with the left half 318 in a XOR'ing operation 314b, and the output of the XOR operation 314b can become the right half input for the third round. The left half input for the third round can be the same as the right half input 316 for the second round. This process can be repeated until a desired number of rounds are completed. After the last round, the right and left halves are joined, and a final permutation 312 completes the algorithm, which results in cipher text 314.

Figure 4:
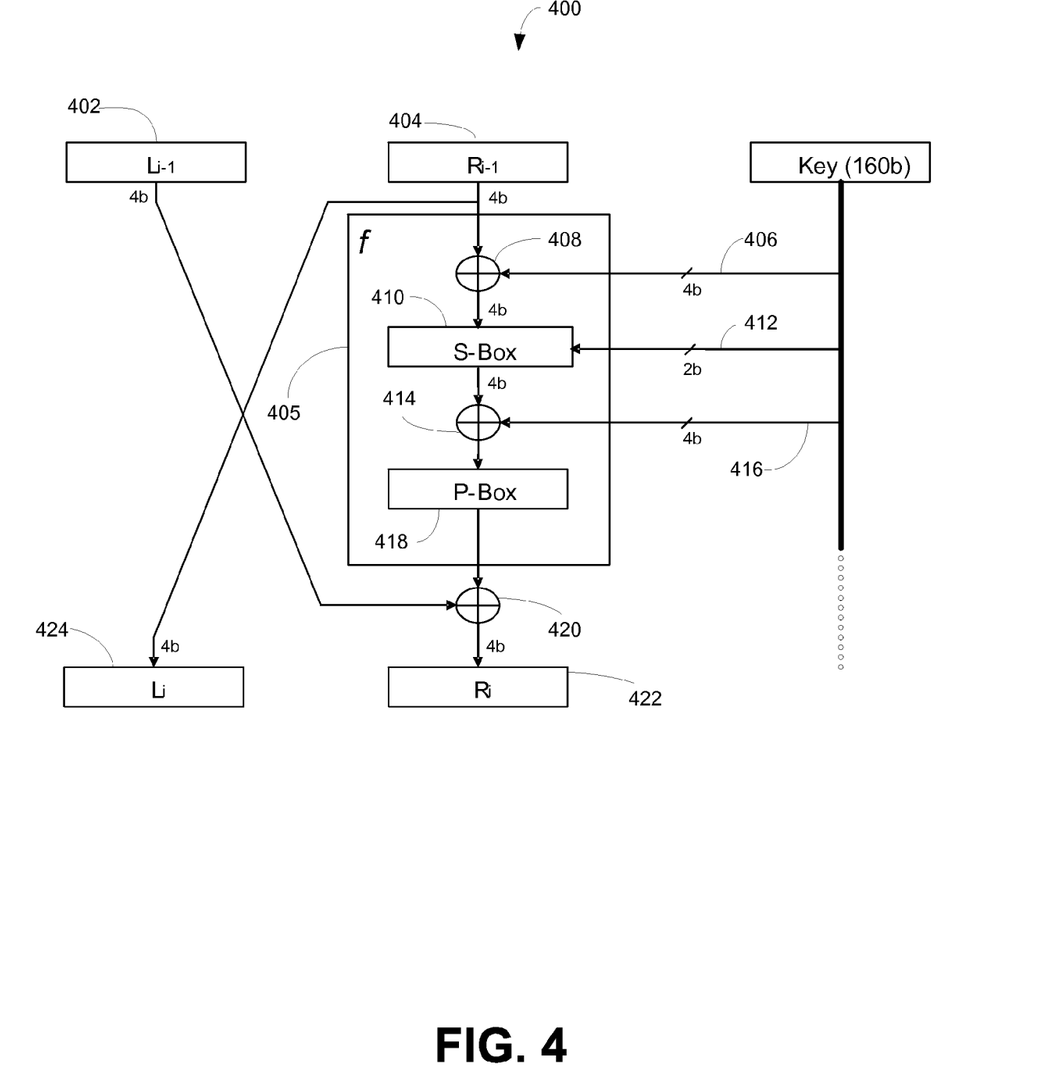
FIG. 4 is a block diagram of one round of the process shown in FIG. 3.

FIG. 4 is a block diagram of one round 400 of the process shown in FIG. 3. As shown in FIG. 4, 4-bit halves 402 and 404 (labeled $L_{i-1}$ and $R_{i-1}$) are input into a round of the encryption process shown in FIG. 3. In an encryption function, "f" 405, the $R_{i-1}$ half 404 is XOR'ed with a 4-bit key 406 in a XOR'ing process 408, and the output of the XOR process 408 is input into a key-dependent substitution box ("S-Box") 410 that chooses one of the four possible S-Boxes for a non-linear transformation on 4-bit input that is sent from the XOR'ing process 408 into the S-Box 410. For example, a 2-bit key 412 can determine which of four possible S-Boxes is used as the S-Box 410 to transform the data input received from the XOR process 408. The particular S-Box that is selected as the S-Box 410 for use in the process 400 can receive the 4-bit input from the XOR process 408 and can output a 4-bit output according to a lookup table defined by the particular S-Box selected by the 2-bit key 412.

An example S-Box table can receive as input the data bits, b0, b1, b2, and b3, and an output from the S-Box can be determined from TABLE 2 below:

TABLE 2

|  |  | (b0, b1) | | | |
|---|---|---|---|---|---|
|  |  | 00 | 01 | 10 | 11 |
| (b2, b3) | 00 | 1110 | 0100 | 1101 | 0001 |
|  | 01 | 0010 | 1111 | 1011 | 1000 |
|  | 10 | 0011 | 1010 | 0110 | 1100 |
|  | 11 | 0101 | 1001 | 0000 | 0111 |

That is, for example, the 4-bit data stream "0110" will become "1010" after the transformation through the above-described S-Box, and the 4-bit data stream "0111" will become "1001" after the transformation through the above-described S-Box. Thus, in this example, a change in just one bit in the input data introduces a change in two bits of the output from the S-Box, thereby introducing non-linearity into the process.

Referring again to FIG. 4, the 4-bits output from the S-Box 410 can be input into another XOR process 414 and XOR'ed with another 4-bits of key 416, and the output of the XOR process 414 can then be sent to a permutation process 418 that swizzles the bits it receives a input. Then, the output of the permutation process 418 is the output of the function "f" 405 and this output from the function "f" is combined with the $L_{i-1}$ half 402 via another XOR process 420. The output of this final XOR process 420 becomes the new right half, $R_i$, 420 that is used for the next round of the process 300. The old right half, $R_{i-1}$, 404 becomes the new left half, $L_i$, 424 that is used in the next round of the process 300. The new halves, $L_i$ and $R_i$, 424 and 422, are used as inputs in a new round. The new round can use different keys from the previous round.

The rounds can be repeated n times, as shown in FIG. 3, where n can be chosen based on delay through one round and clock cycle budget of the processor that processes the data. If a greater number of rounds are used, then the encryption algorithm becomes stronger, but the process takes longer, and area used to perform the operation is greater.

As explained above, the process shown in FIG. 3 and FIG. 4 can also be extended to N-bit encryption (i.e., where data is encrypted in N-bit block sizes), where N is greater than 8 by parsing an N-bit block into a plurality of smaller sub-blocks. Each round of the process 300 can use different keys. For example, for encrypting 32-bit input data using 16 rounds of the process, a total of 640 bits of keys would be used (i.e., 10 bits per round per each constituent 8-bit sub-block). One or more keys used in the process can be based on random numbers generated from an on-chip Random Number Generator that generates new random numbers every time the chip boots up. In addition, as explained above, one or more keys used in the processes of FIG. 3 and FIG. 4 can be based on the memory address to which the data is to be written, thus providing an additional layer of security in the encryption scheme.

The effect of small changes in input data to the Memory Encryption Unit that performs the process 300 on the output from the MEU can be illustrated by the following examples. For example, the impact of changing one bit in input data, while keeping the memory address constant, can be seen from the following TABLE 3, where the different input bits, A0, A1, A3, and A9 causes the encrypted output to be different from each other in the first two bits, as shown below:

TABLE 3

| Plaintext Data | Address | Encrypted Data |
|---|---|---|
| A07D5463 | 3B6D43F0 | F10A9884 |
| A17D5463 | 3B6D43F0 | D80A9884 |
| A37D5463 | 3B6D43F0 | 010A9884 |
| A97D5463 | 3B6D43F0 | 300A9884 |

In another example, when using the memory address as a key in the encryption process, the impact of changing one bit in the input address, while keeping the data values constant, can be seen from the following TABLE 4, where the different address bits, F0, F4, and F8 causes the encrypted output to be different in all of the bits.

TABLE 4

| Plaintext Data | Address | Encrypted Data |
|---|---|---|
| 93A4286D | 3B6D43F0 | 9E2E7639 |
| 93A4286D | 3B6D43F4 | 56D878E7 |
| 93A4286D | 3B6D43F8 | 696DC51C |

In still another example, the impact of using different S-BOXes for each byte in the input address, while keeping the data values constant, can be seen from the following Table 5, where different S-Boxes are used in the process 300 for each byte.

TABLE 5

| Plaintext Data | Address | Encrypted Data |
|---|---|---|
| A9A9A9A9 | 3B6D43F0 | 30895856 |
| FFFFFFFF | 3B6D43F0 | 07AACE81 |
| 00000000 | 3B6D43F0 | C955BB02 |
| 00000000 | 00000000 | 818762EF |
| FFFFFFFF | FFFFFFFF | 09B7A231 |

Thus, when using the above-described encryption process, encryption can be performed on an 8-bit boundary to efficiently handle byte writes from a processor to a memory without having to go through a read-decrypt-modify-encrypt-write cycle. The S-Boxes used in the encryption process can be chosen to propagate a one-bit change in the input data or key value to all the bits of the output in a minimal number of rounds. The same symmetric algorithm can be used to encrypt or decrypt data, where the only difference between encryption and decryption is that the keys must be used in the reverse order for decryption as the order in which they are used for encryption. Thus, differential and related-key cryptanalysis attacks are not feasible to this algorithm because a different key is used for each round. Linear cryptanalysis attacks are heavily dependent on the structure of S-boxes, and key-dependent S-Boxes make the algorithm more secure against those attacks.

Figure 5:
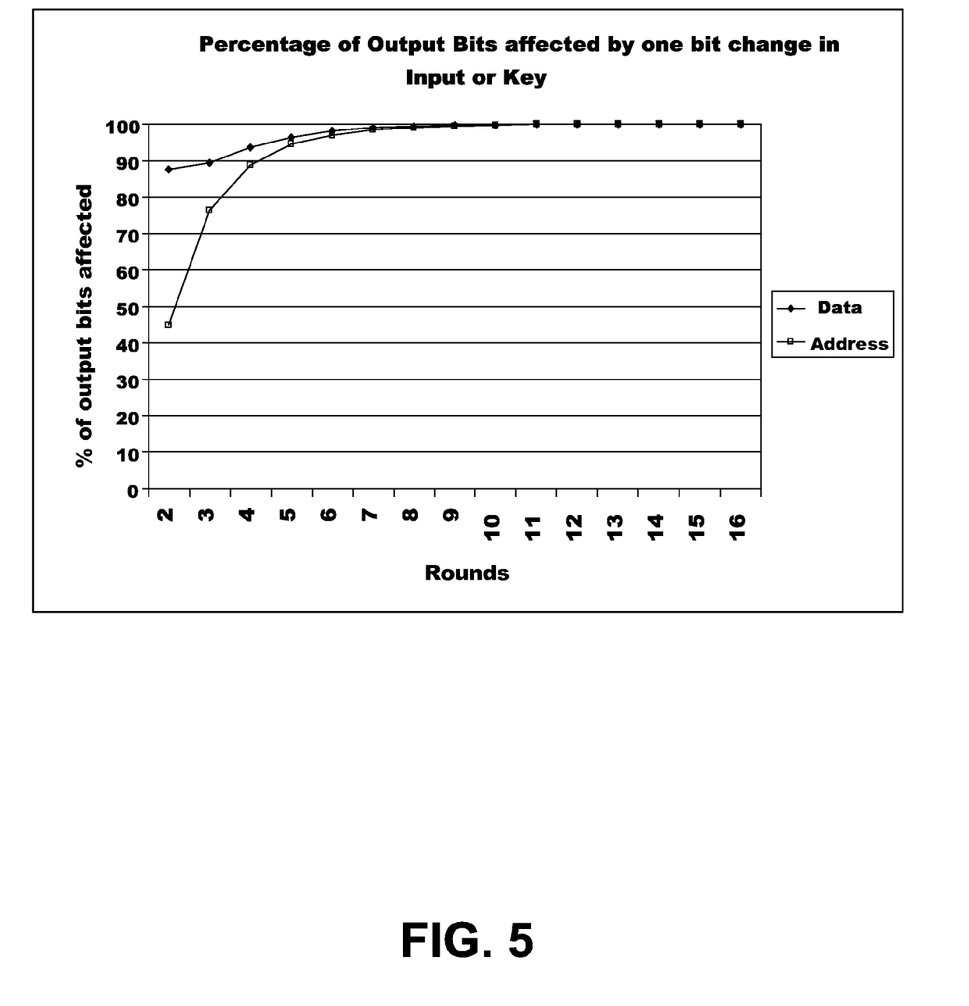
FIG. 5 is a plot of an effectiveness of the encryption process shown in FIG. 3 as a function of the number of rounds used in the process.

FIG. 5 is a plot of an effectiveness of the encryption process shown in FIG. 3 as a function of the number of rounds used in the process. The graph of FIG. 5 shows the percentage of output bits affected by a one-bit change in ciphertext or key as a function of the number of rounds used in the process 300. To generate the plots in FIG. 5, data was collected from a Monte Carlo simulation of 100,000 samples in which one-bit in the data/address was randomly changed and the number of bits that were affected in ciphertext after each round of the process 300 was determined.

Figure 6:
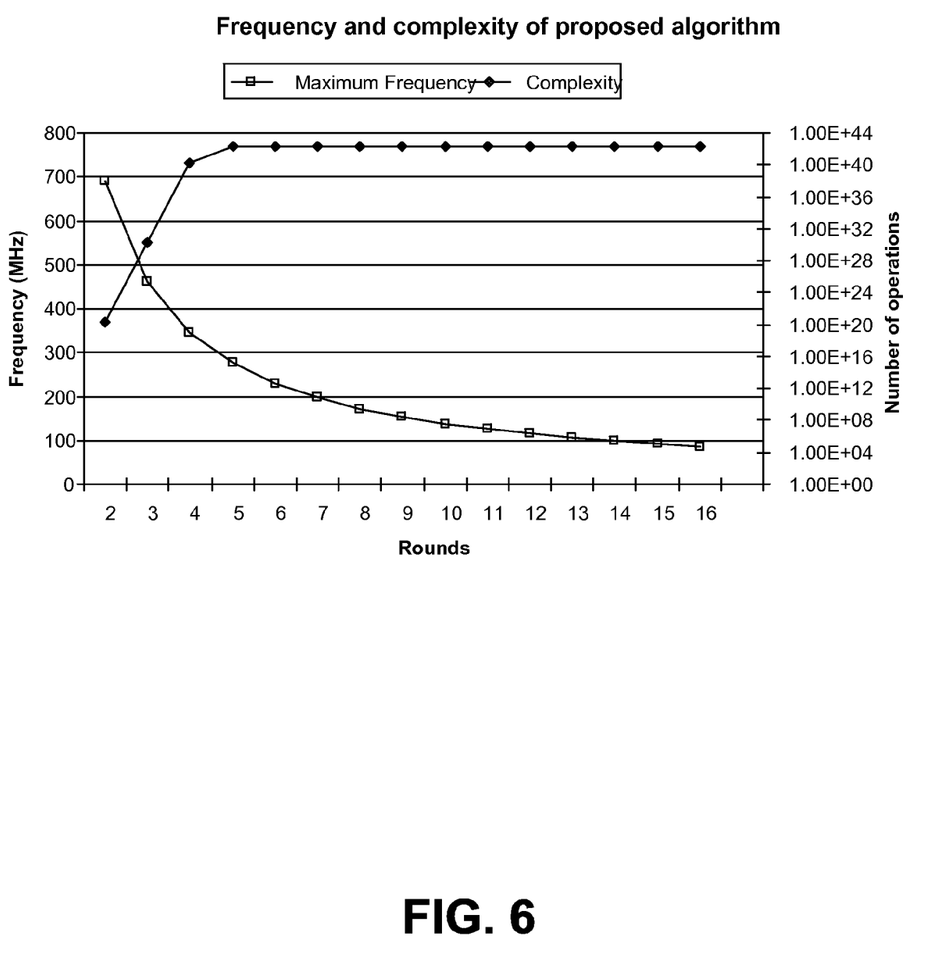
FIG. 6 is a plot of an effectiveness of, and of the maximum clock frequency of a particular exemplary processor for use with, the encryption process shown in FIG. 3 as a function of the number of rounds used in the process, when the rounds will be completed within one clock cycle of the processor

FIG. 6 is a plot of an effectiveness of, and of the maximum clock frequency of a particular, exemplary processor for use with, the encryption process shown in FIG. 3 as a function of the number of rounds used in the process, when the rounds will be completed within one clock cycle of the processor. In one non-limiting example, when using 65 nm technology cells, one round of this algorithm could be executed in about 725 ps, so for an algorithm that consumes just one processor cycle for the whole operation, FIG. 6 shows the maximum operable processor frequency, such that an n-round encryption process can be completed in one such processor cycle. FIG. 6 also shows the complexity required to break the algorithm with respect to number of rounds. As can be seen from FIG. 6, after just four rounds, the number of operations that are required to break the algorithm is in excess $10^{40}$, and when four rounds are used, the encryption algorithm can be performed in one clock cycle of a processor operating at a clock frequency of over 300 MHz. Of course, for different technology cells and different processor speeds, the values used in FIG. 6 would be different.

Figure 7:
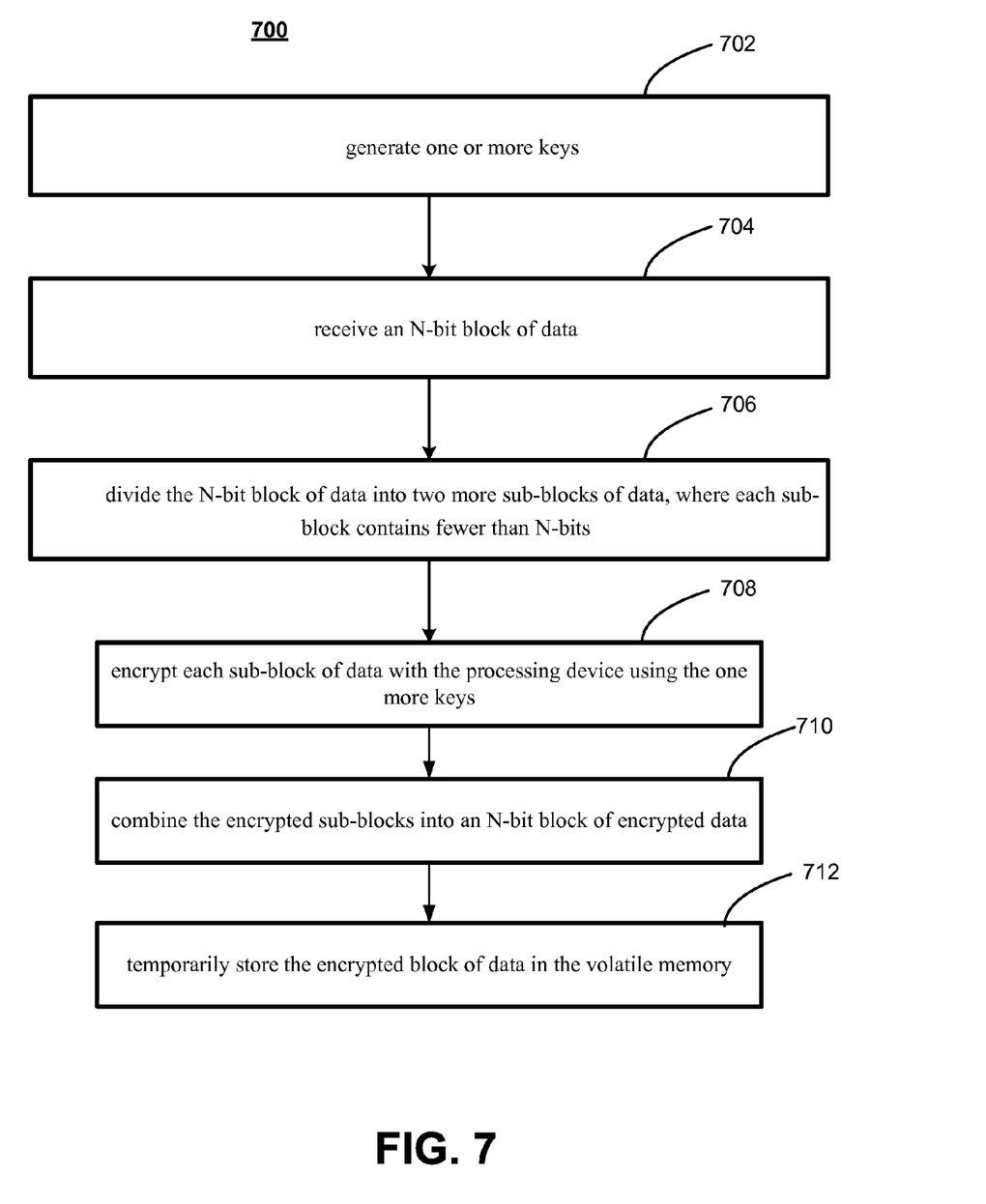
FIG. 7 is a flow chart of a process 700 for of encrypting data for temporary storage in a volatile memory operably connected to a memory encryption unit of a device adapted for processing the data.

FIG. 7 is a flow chart of a process 700 for of encrypting data for temporary storage in a volatile memory operably connected to a memory encryption unit of a device adapted for processing the data. In a first step (702) one or more keys are generated within the device. For example, a random number generator can generate one or more random numbers, and the random numbers, or portions of the random number(s), can be used as the keys or the keys can be based on the random number(s). An N-bit block of data can be received at the memory encryption unit (704), and the N-bit block of data can be divided into two more sub-blocks of data (706), where each sub-block contains fewer than N-bits. For example, N can be equal to 16, 32, 64, 128, 256, etc. and the sub-blocks can contain, for example, 8-bits or 16-bits (when N is greater than 16). Thus, for example, each sub-block can contain N/2, N/4, N/8, N/16 bits. Each sub-block of data can be encrypted (708) with the memory encryption unit using the one more keys. For example, the sub-blocks can be encrypted by applying a non-linear transformation (e.g., by applying an S-Block transformation) to data bits of the sub-block. Further, multiple rounds of a symmetric block cipher can be used to encrypt each sub-block, and different keys can be used in each round. The encrypted sub-blocks are then combined into an N-bit block of encrypted data (710), and the encrypted block of data is temporarily stored in the volatile memory (712).

Figure 8:
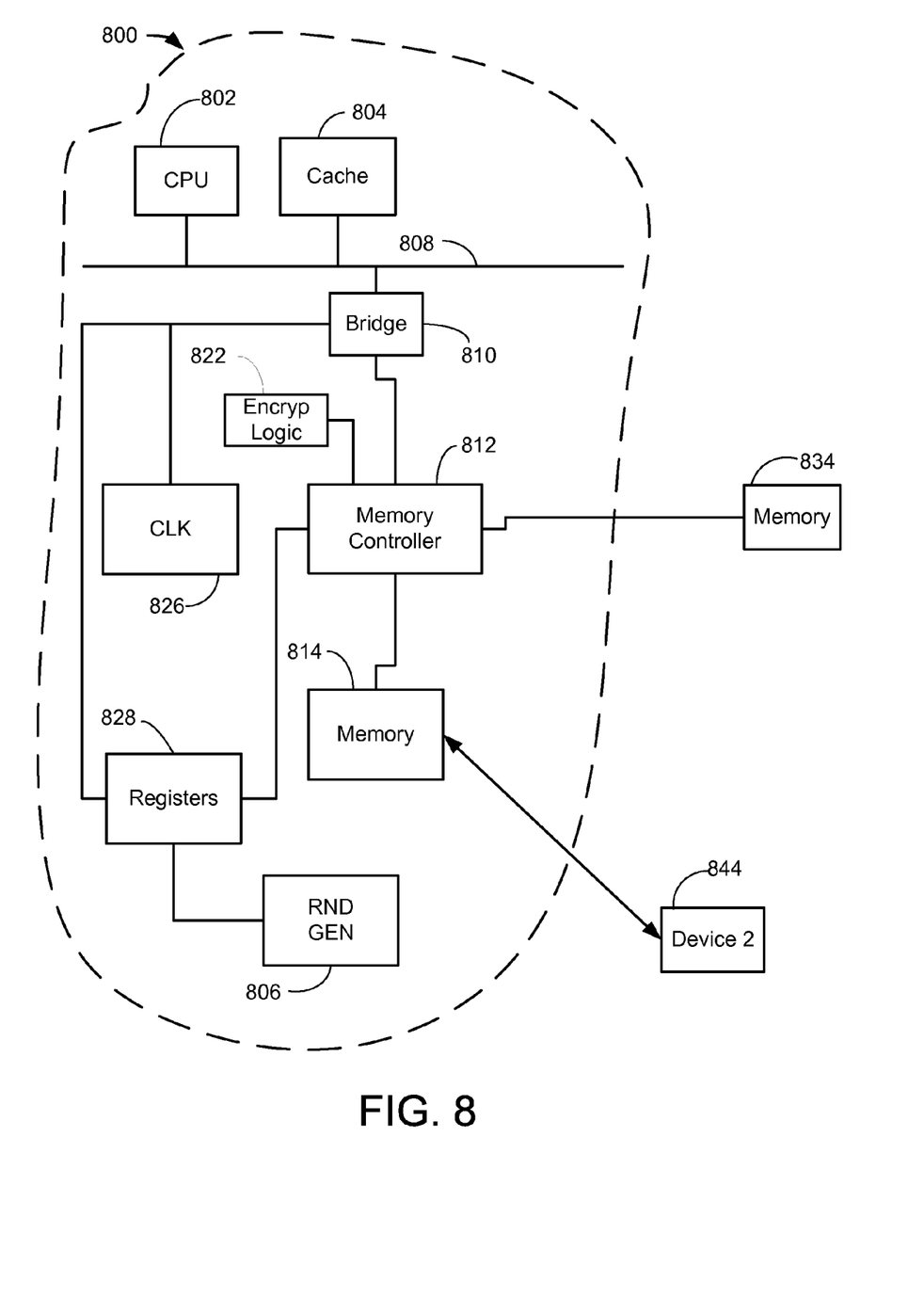
FIG. 8 is a block diagram of a system that can be used to encrypt data for temporary storage in an external volatile memory in the course of being processed by a device, where the data is encrypted using the encryption process shown in FIG. 3.

FIG. 8 is a block diagram of a system 800 that can be used to encrypt data for temporary storage in an external volatile memory 834 in the course of being processed by a device, where the data is encrypted using the encryption process shown in FIG. 3. In one implementation, the device can be configured to process data for playing media content (e.g., on an external rendering device). In other implementations, the device can be used to store data (e.g., on an external storage device), to compile, execute or otherwise process code, to render, execute, store, or otherwise process digital content, secure keys, applications, operating systems, baseband stacks etc. The common element between all such implementations is that the device is used to write data to an external volatile memory for temporary storage in the volatile memory. Thus, in one non-limiting exemplary implementation shown in FIG. 8, the system 800 can be used to provide encryption of data for temporary storage in an external volatile memory 834, where the data is processed by a processor for rendering or playing on an external device 844 (e.g., a video display, a speaker, etc.).

The 800 system can include a CPU 802 that is paced by a clock 826 at a clock frequency and a cache 804 that communicates with the CPU via a front side bus 808. The CPU 802 can be connected, via a bridge 810, to a memory controller 812 that provides a link to an on-chip main memory 814 and to an off-chip memory 834 (e.g., a volatile off-chip memory). A random number generator 806 can be used for generating keys that can be stored in registers 828 and used in the above-described encryption process.

When data are written to the off-chip memory 834 they are first encrypted according to the encryption process described above. The encryption process can be implemented, for example, by a memory encryption unit (MEU) that resides in the memory controller 812 or in a logic block 822 adjacent to the memory controller. Thus, the CPU 802 can issue a read or write command to the external memory 834, and the MEU of the memory controller 812 or the logic block 822 can encrypt/decrypt the data as it passes between the chip 800 and the memory 834.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) for use with the methods and apparatuses described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps (e.g., any or all steps shown in the flow chart of FIG. 7) may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method, implemented in one or more data processing devices, of encrypting data for temporary storage in a volatile memory operably connected to a memory encryption unit of a device adapted for processing the data, the method comprising:
    generating one or more keys within the device;
    receiving, at the memory encryption unit, an N-bit block of data to be stored temporarily in an encrypted form in the volatile memory, wherein N is 8 or more;
    dividing the N-bit block of data into two more sub-blocks of data, wherein each sub-block contains fewer than N-bits:
    encrypting each sub-block of data with the memory encryption unit using one or more of the generated keys;
    combining the encrypted sub-blocks into an N-bit block of encrypted data independent of the one or more keys; and
    temporarily storing the encrypted block of data in the volatile memory.

2. The method of claim 1, wherein generating the one or more keys within the device includes generating the one or more keys upon booting the device.

3. The method of claim 1, wherein generating the one or more keys within the device includes generating the one or more keys based on a memory address to which the block of data is written.

4. The method of claim 1, wherein the N-bit block of data is a 64-bit block of data.

5. The method of claim 1, wherein each sub-block contains M-bits and M is equal to N/4, N/8, N/16, N/32, or N/64.

6. The method of claim 1, wherein each sub-block contains 8-bits.

7. The method of claim 1, wherein encrypting each sub-block includes applying a non-linear transformation to data bits of the sub-block.

8. The method of claim 7, wherein the non-linear transformation includes applying an S-block transformation of the data bits of the sub-block.

9. The method of claim 1, wherein encrypting each sub-block includes applying N rounds of a symmetric block cipher function to the sub-block, where N is greater than 2.

10. The method of claim 9, wherein different subkey is used in each round.

11. A data processing apparatus, the apparatus comprising:
    a volatile memory;
    a random number generator adapted for generating random numbers from which one or more keys are generated;
    a memory encryption unit configured for:
        receiving an N-bit block of data to be stored temporarily in an encrypted form in the volatile memory, wherein N is 8 or more;
        dividing the N-bit block of data into two more sub-blocks of data, wherein each sub-block contains fewer than N-bits;
        encrypting each sub-block of data using the one or more keys;
        combining the encrypted sub-blocks into an N-bit block of encrypted data independent of the one or more keys; and
        writing the encrypted N-bit block of data to the volatile memory.

12. The data processing apparatus of claim 11, wherein the memory encryption unit is further configured for:
    receiving an the encrypted N-bit block of data from the volatile memory, wherein N is 8 or more;
    dividing the encrypted N-bit block of data into two more sub-blocks of data, wherein each sub-block contains fewer than N-bits;
    decrypting each sub-block of data using the one more keys;
    combining the decrypted sub-blocks into an N-bit block of unencrypted data; and
    passing the block of unencrypted data to a processing device.

13. The data processing apparatus of claim 11, wherein generating the one or more keys within the device includes generating the one or more keys upon booting the device.

14. The data processing apparatus of claim 11, wherein the memory encryption unit is further configured for encrypting each sub-block of data using keys based on a memory address to which the N-bit block of data is to be written.

15. The data processing apparatus of claim 11, wherein the N-bit block of data is a 64-bit block of data.

16. The data processing apparatus of claim 11, wherein each sub-block contains M-bits and M is equal to N/4, N/8, N/16, N/32 or N/64.

17. The data processing apparatus of claim 11, wherein each sub-block contains 8-bits.

18. The data processing apparatus of claim 11, wherein encrypting each sub-block includes applying a non-linear transformation to data bits of the sub-block.

19. The data processing apparatus of claim 18, wherein the non-linear transformation includes applying an S-block transformation of the data bits of the sub-block.

20. The data processing apparatus of claim 11, wherein encrypting each sub-block includes applying N rounds of a symmetric block cipher function to the sub-block, where N is greater than 2.

21. The data processing apparatus of claim 20, wherein a different subkey is used in each round.

22. A data processing apparatus for processing protected content, the apparatus comprising:
    a central processing unit;
    a volatile memory;
    a random number generator adapted for generating random numbers from which one or more keys are generated;
    a memory encryption unit operably connected to the volatile memory and configured for:
        receiving an N-bit block of data to be stored temporarily in an encrypted form in the volatile memory from the central processing unit, wherein N is 8 or more;
        dividing the N-bit block of data into two more first sub-blocks of data, wherein each first sub-block contains eight or fewer bits;
        encrypting each first sub-block of data using a non-linear symmetric algorithm based on the one more keys;
        combining the encrypted first sub-blocks into an N-bit block of encrypted data independent of the one or more keys;
        writing the encrypted N-bit block of data to the volatile memory;

receiving the encrypted N-bit block of data from the volatile memory;

dividing the encrypted N-bit block of data into two more second sub-blocks of data, wherein each second sub-block contains eight or fewer bits;

decrypting each second sub-block of data using the non-linear symmetric algorithm based on the one more keys;

combining the decrypted second sub-blocks into an N-bit block of decrypted data; and transmitting the decrypted N-bit block of data to a rendering device.

\* \* \* \* \*